US 12,134,318 B2
Nov. 5, 2024

(12) United States Patent
Salter et al.

(54) GUIDED DRIVER POSITIONING SYSTEMS AND METHODS

(71) Applicant: Ford Global Technologies, LLC, Dearborn, MI (US)

(72) Inventors: Stuart C. Salter, White Lake, MI (US); Mike Kipley, Saline, MI (US); Adrian Aguirre, Alvaro Obregon (MX); Hussein Berry, Dearborn, MI (US); John Van Wiemeersch, Novi, MI (US); James Simas, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 385 days.

(21) Appl. No.: 17/657,701

(22) Filed: Apr. 1, 2022

(65) Prior Publication Data
US 2023/0311652 A1 Oct. 5, 2023

(51) Int. Cl.
| | |
|---|---|
| *B60K 35/00* | (2024.01) |
| *B60R 16/037* | (2006.01) |
| *B60W 40/08* | (2012.01) |
| B60K 35/28 | (2024.01) |
| B60K 35/65 | (2024.01) |

(52) U.S. Cl.
CPC ............ *B60K 35/00* (2013.01); *B60R 16/037* (2013.01); *B60W 40/08* (2013.01); *B60K 35/28* (2024.01); *B60K 35/654* (2024.01); *B60K 2360/176* (2024.01); *B60W 2540/223* (2020.02); *B60W 2540/225* (2020.02); *B60W 2540/227* (2020.02)

(58) Field of Classification Search
CPC ...... B60K 35/00; B60K 35/28; B60K 35/654; B60K 2360/176; B60K 2360/21; B60K 35/65; B60K 35/658; B60R 16/037; B60R 16/0231; B60W 40/08; B60W 2540/223; B60W 2540/225; B60W 2540/227; B60N 2/0278; B60N 2210/24; B60N 2/0268; B60N 2/0273; B60N 2/0279
See application file for complete search history.

(56) References Cited

U.S. PATENT DOCUMENTS

| | | | |
|---|---|---|---|
| 9,707,911 B1 * | 7/2017 | Myers | ................... B60R 16/037 |
| 10,144,290 B2 | 12/2018 | Jang et al. | |
| 10,793,004 B2 * | 10/2020 | Hwang | ............... G06F 3/04817 |

(Continued)

FOREIGN PATENT DOCUMENTS

| | | | | | |
|---|---|---|---|---|---|
| CN | 103995580 A | * | 8/2014 | ............. | G06F 3/013 |
| CN | 108536134 A | * | 9/2018 | ........... | G05D 1/0231 |

(Continued)

OTHER PUBLICATIONS

LG Newsroom, Makes Driving and Riding Safer with In-Vehicle Cabin Camera, Aug. 2, 2021, 1-8.

*Primary Examiner* — Mary Cheung
(74) *Attorney, Agent, or Firm* — Frank Lollo; Eversheds Sutherland (US) LLP

(57) ABSTRACT

Guided driver positioning system and methods are disclosed herein. An example method can include determining gait for a user of a vehicle from images obtained from a camera, the gait being indicative of a posture of the user, determining a distance between the user and a display of the vehicle, and automatically adjusting a vehicle component in response to the gait and the distance to change a user position relative to the display.

18 Claims, 4 Drawing Sheets

(56) References Cited

U.S. PATENT DOCUMENTS

| | | | |
|---|---|---|---|
| 2009/0278677 A1* | 11/2009 | Arie | B60K 35/00 |
| | | | 340/461 |
| 2015/0293585 A1 | 10/2015 | Seok et al. | |
| 2016/0196098 A1* | 7/2016 | Roth | G09G 5/00 |
| | | | 715/761 |
| 2020/0072635 A1* | 3/2020 | Hornstein | B60N 2/976 |
| 2020/0216087 A1* | 7/2020 | Kim | B60W 10/196 |
| 2021/0182609 A1* | 6/2021 | Arar | G06F 18/214 |
| 2022/0121867 A1* | 4/2022 | Arar | B60W 60/001 |

FOREIGN PATENT DOCUMENTS

| | | | | |
|---|---|---|---|---|
| CN | 109455155 A | * | 3/2019 | |
| CN | 112208398 A | * | 1/2021 | B60N 2/0224 |
| CN | 112364765 A | * | 2/2021 | |
| JP | 2020079879 A | * | 5/2020 | |

\* cited by examiner

GUIDED DRIVER POSITIONING SYSTEMS AND METHODS

BACKGROUND

Vehicle cabin configurations may result in customers struggling to get or remain comfortable in their seat. People may desire to raise/adjust their seated position, adjust pedal positions, adjust mirror positioning, and/or adjust their steering column. These issues may be exacerbated for new users who are attempting to adjust a plurality of vehicle features for the first time.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
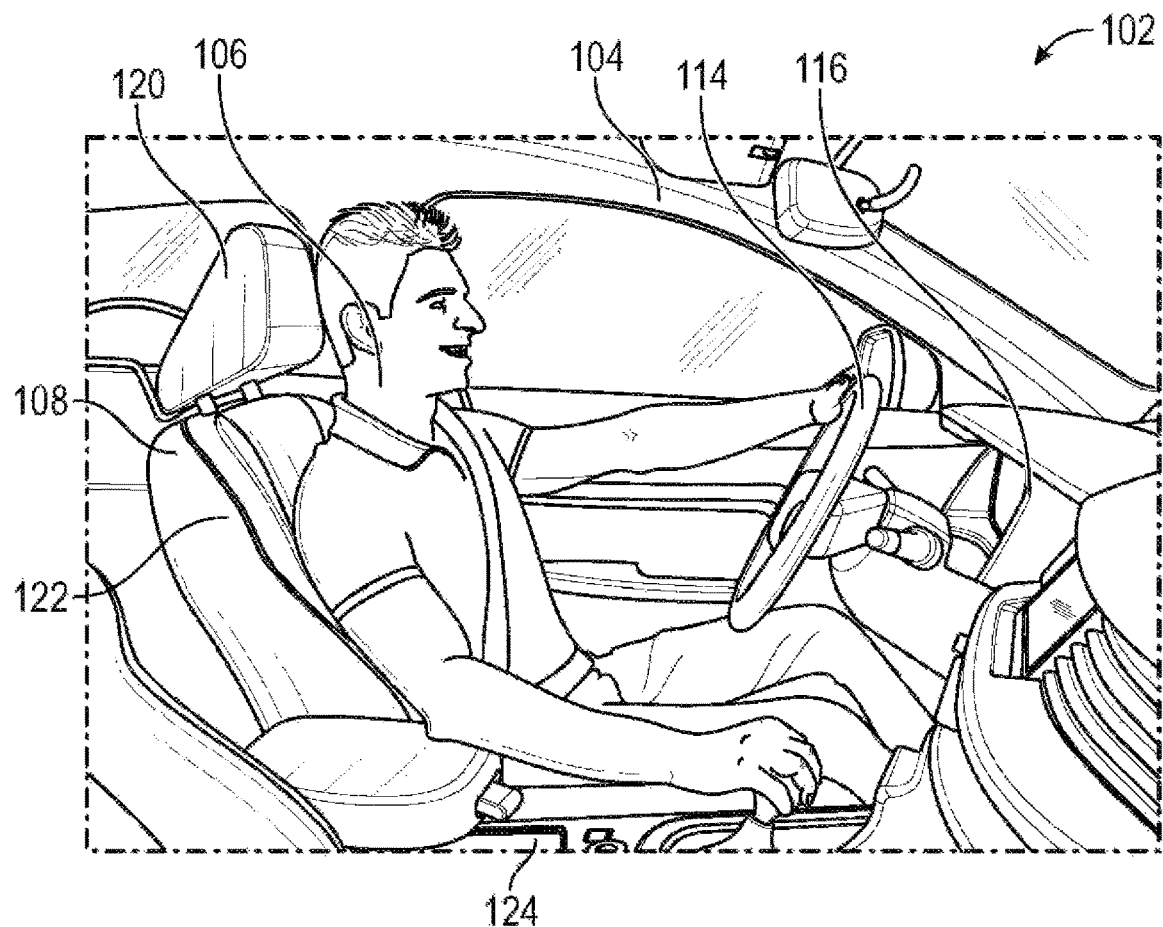
FIG. 1 illustrates an example environment in accordance with one or more embodiments of the disclosure.
Figure 1:
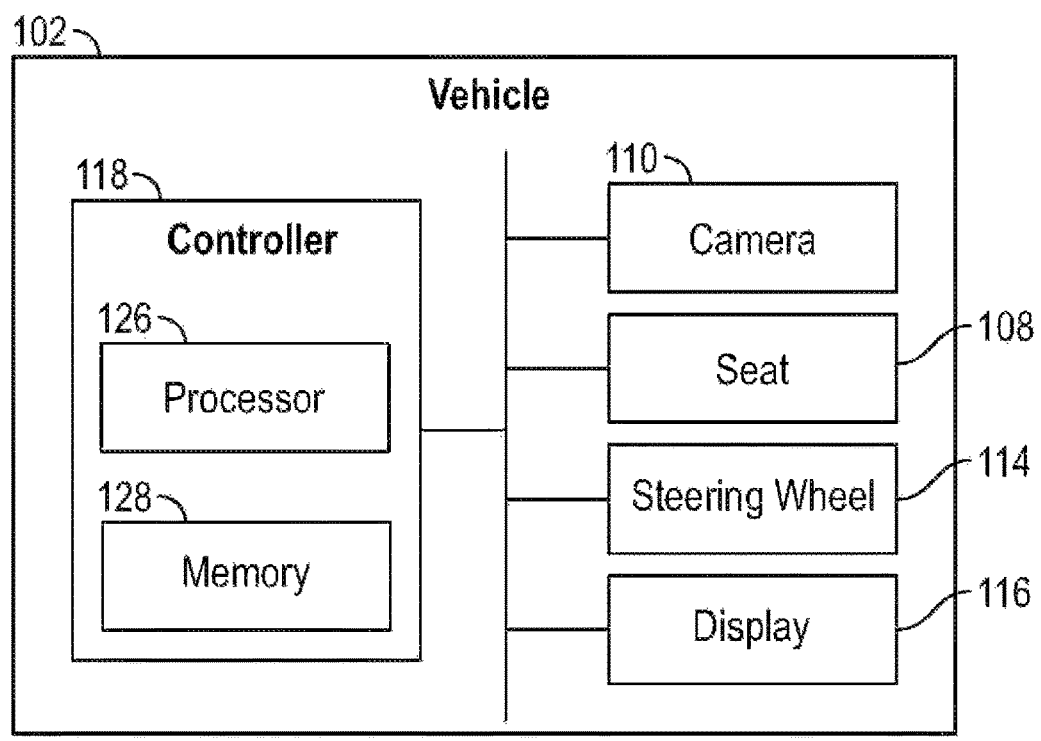

The present disclosure pertains to guided driver positioning systems that leverage driver monitor cameras and related algorithms. Broadly, the present disclosure can involve executing a sequence of adjustments to vehicle seats or other components, such as mirrors, for customer convenience in response to determining user gait determined through images captured by a camera. In some instances, user position can be continuously adjusted for user convenience. This can include continuously or periodically monitoring customer eye movement to identify what a user is looking at in real-time or near-real-time.

An example system can adjust the positioning of widgets, applications, and display based on steering wheel settings. In some instances, an example system can leverage radar to measure the distance from the screen to the user along with gait analysis to set proper initial settings for seat components, pedal (gas and brake), steering column, steering wheel, mirrors, and so forth.

In some instances, when the customer approaches or enters the vehicle (and in some instances the first time), an example system can conduct a gait analysis. This gait analysis can include but is not limited to measuring leg, arm, and body dimensions to establish initial settings for the customer using a look-up table. Next, an example system can assess an exact (or approximate) head position for the user (driver or passenger), which can vary along with the user eye position. An example system can then finalize an initial adjustment for the user using a look-up table. The example system may announce that it is making adjustments to the seat configuration so the user understands adjustments are being performed.

An example system can also monitor user adjustments and adjust other vehicle components on screens accordingly. For example, if the user moves a steering wheel upward, an example system can tilt the screen up or adjust Heads Up Display (HUD) positioning to make it convenient for the customer. Then, the system may follow up with an audible question "does this help?" If the user answers in the negative the adjustments can be reversed. If the user answers in the affirmative the adjustments can be maintained.

Critical items can be moved higher on the screen so the user can still view over the steering wheel. Soft buttons can be moved closer to the user based on both the user's arm length and how often the user uses the button(s). An example system can track driver eye position and capture visual areas of interest to the driver (besides critical ones such as speed) and reposition them for convenience. The system can learn by determining what the driver glances at repeatedly. For example, if the driver periodically glances at a radio display on the center stack, that element can be pulled directly in front of the driver's vision (after audio confirms the move). Navigation might be moved right next to vehicle speed at the top of the screen to put it in the driver's easy line of sight.

To mitigate confusion caused by information, an icon, or gauge that typically occupies spot A may no longer be in a familiar spot if is moved to spot B based on user observation. In these instances, the system could optionally show the desired information in the A and B spots for a series of drive cycles for a given driver (e.g., 10 ignition events, 10 days, etc.) to train the user. Over that time, the user may learn to look in either spot and then once spot A is deleted, they know it is now in spot B.

The system may also provide an option to change icon size depending on distance and display mode. That is, if the customer moves seats closer to the screen, the vehicle provides more displays on-screen with a smaller font as the customer can now view easier.

Illustrative Embodiments

Figure 2:
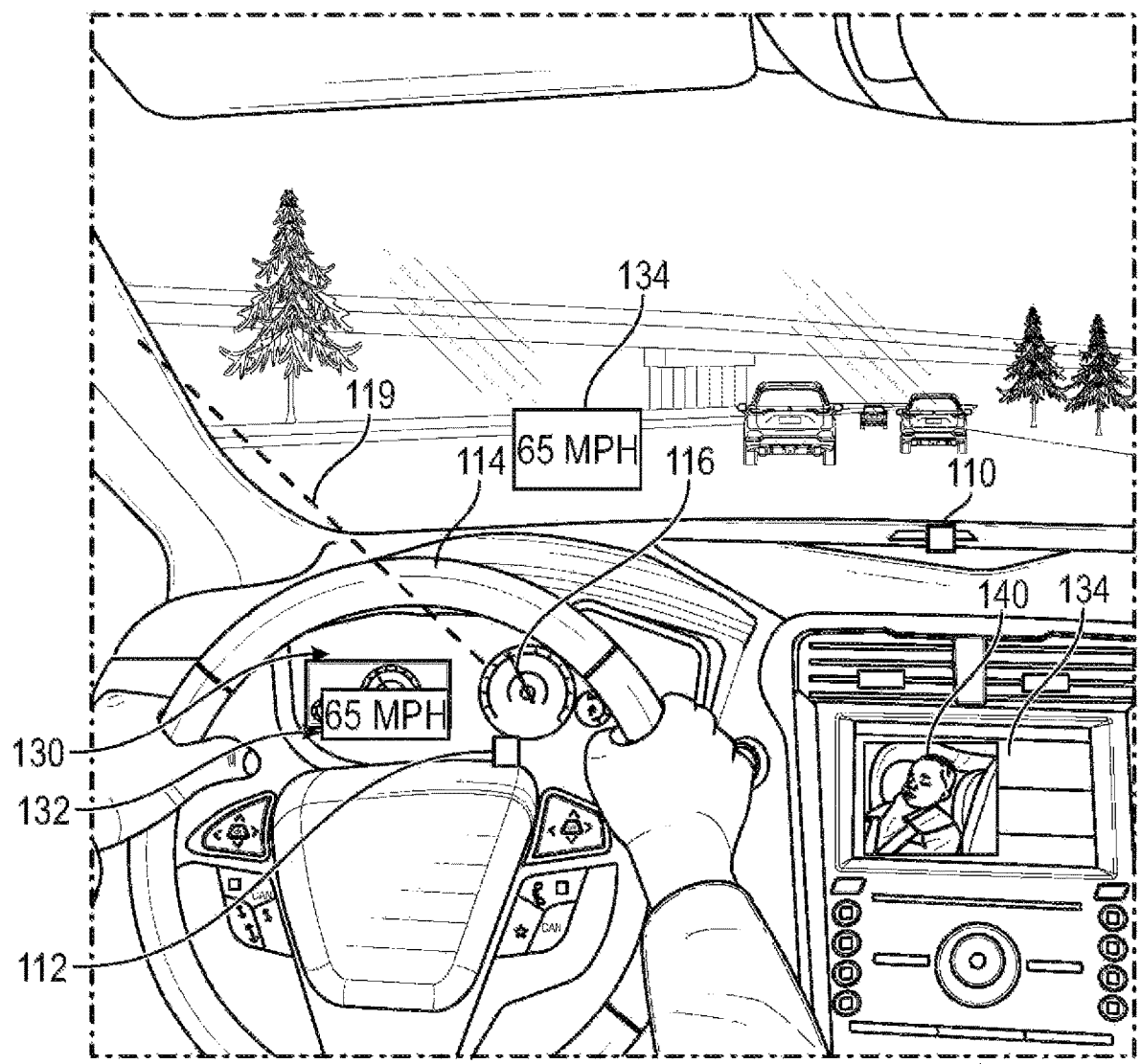
FIG. 2 illustrates a perspective view of a driver in a vehicle in accordance with one or more embodiments of the disclosure.

Turning now to the drawings, FIGS. 1 and 2 collectively depict an illustrative architecture in which techniques and structures of the present disclosure may be implemented. The architecture can include a vehicle 102 having a cabin 104, a user which in this example is a driver 106 sitting in a seat 108. The vehicle 102 can also include a camera 110, a distance measuring device 112, a steering wheel 114, and a display 116. In some instances, the vehicle 102 includes a controller 118 used to control vehicle components.

The seat 108 can comprise adjustable components such as a headrest 120, a seatback 122, and a seat pan 124. To be sure, the seat 108 can include additional adjustable components. Each of these components can be electrically driven by motors, solenoids, or other motorizing elements. In some instances, the adjustable components of the seat 108 can be operated by the controller 118 as will be discussed in greater detail herein.

It will be understood that establishing a comfortable seated position for the driver 106 may sometimes be difficult. Factors related to driver positioning can include driver head positioning, distance from the steering wheel 114 and/or the display 116, and/or combinations thereof.

To determine an optimal seated driver position, when the driver 106 enters the vehicle and sits in the seat 108, the controller 118 can be triggered to perform a driver position adjustment. The controller 118 can include a processor 126 and memory 128. The memory stores instructions that can be executed by the processor 126 to perform methods disclosed herein related to driver (or passenger) seated position, display configurations, vehicle component positioning (such as mirrors, display contents, and so forth), and eye gaze tracking—just to name a few. When referring to operations performed by the controller 118 or vehicle 102, this will be understood to include the execution of instructions by the processor 126 to affect an operation of a vehicle component or feature. In some instances, the controller 118 can cause components of the vehicle to adjust responsively by transmitting signals to controllers or components that actuate the movement of vehicle components. For example, the controller 118 can cause the steering wheel to adjust by sending signals to a motor controller of the steering wheel. The controller 118 can cause adjustments to the locations of objects on a screen by transmitting signals to a graphics processing unit or controller of the display 116.

In some instances, the controller 118 can be configured to perform a gait analysis of the driver 106 when they sit in the seat 108. The controller 118 can obtain images from the camera 110 and perform image processing to determine measurements of a body of the driver 106. For example, the gait analysis can include determining arm and/or leg length, torso length, head size and position, as well as other anatomical or biometric parameters. In addition to gait analysis, the controller 118 can utilize the output of the distance measuring device 112 to detect a distance between the driver 106 and the display 116 and/or the steering wheel 114. The distance measuring device 112 can include, for example, a LiDAR (light imaging distance and ranging) sensor, an ultrasonic sensor, or another equivalent sensor that can detect the distance between two objects.

Referring now to FIGS. 1 and 2 collectively, in some instances, the display 116 can include an instrument cluster that is located behind the steering wheel 114. The instrument cluster can include any one or more of a plurality of selectable gauges such as a speedometer, a tachometer, navigation, fuel level, fuel range, and so forth—just to name a few. Depending on the seated position of the driver, all or a portion of the display may be obscured by the steering wheel 114.

Once the controller 118 determines the current seated position of the driver and the distance of the driver from the display 116, the controller 118 can determine adjustments to seat components or other vehicle components to provide the driver with a comfortable seating position that allows the driver to have an unobscured (or minimally obscured) view of the display 116. For example, the controller 118 can infer that the view of the display 116 is obscured, based on the seated position and distance. In response, the controller 118 can cause the seat pan 124 to move up or down to adjust the head of the driver 106 so that a line of sight of the driver 106 is clear. In one example, the controller 118 can automatically cause the steering wheel 114 to tilt to improve the driver's line of sight to the display 116. That is, when additional changes in driver seated position are not preferred, the controller 118 can automatically adjust other vehicle components. In addition to adjusting seat components and/or the steering wheel, adjustments can be made to other related vehicle components. For example, when seat position is adjusted, corresponding changes to side view and/or rearview mirrors can be made to preserve the driver's view of their surroundings or environment.

In yet another example, when changes to driver seating position or vehicle components may be insufficient, the controller 118 can change the location of objects on the display 116. For example, when the upper portion 130 of the display 116 is obscured by the steering wheel 114, the controller 118 can move the location of the speedometer to a lower edge 132 of the display 116. Additionally, if equipped, the controller 118 can activate a heads-up-display 134 to also display the vehicle speed. It will be understood that a speedometer is a critical display component related to vehicle operation. Other critical display elements such as fuel level can also be optimally located on the display or the heads-up display 134.

In some instances, before adjusting the seat or any other vehicle component, the controller 118 can be configured to output an audible message to the driver 106 that adjustments are about to be made to the seat or another vehicle component. That is, the controller 118 provides an audible announcement that the vehicle component is about to be adjusted prior to automatically adjusting the vehicle component. Once adjustments have been made, the controller 118 can be configured to query the driver regarding the adjusting of the vehicle component. If the driver verbally indicates that they do not prefer the adjustment, the controller 118 can reverse the changes, returning the vehicle component to a prior configuration.

Once a preferred driver seating position has been established and other adjustments to vehicle components have occurred (such as steering wheel and/or display tilting), the controller 118 can continue to obtain images from the camera 110 to track driver eye gaze. In some instances, the controller 118 can identify an object on the display 116 or an item in the vehicle that the driver has repeatedly viewed based on eye gaze. For example, if the driver frequently gazes at the satellite radio station presented on a human-machine interface (HMI) 138, such as an infotainment system, the controller 118 can cause automatic display of the satellite radio station on the display 116 or 134 so that the driver does not have to divert their gaze from the display 116 or 134 to view the satellite radio station. What constitutes repeated direction of eye gaze may be dependent on the circumstances. For example, the controller 118 may make this determination based on the user focusing their eye gaze on an object a set number of times within a defined time period. For example, if the driver looks at a display icon a number of times within a time span of five minutes, the controller can cause the icon to be moved. Thus, the controller 118 moves an object to a line of sight of the user, which should be near the display 116 or 134.

To prevent the driver from having to turn around and look at the occupant and/or view them through the rearview mirror, the controller 118 can obtain images of the occupant with the camera 110, when it is safe to do so, and display the images on the display 116, the heads-up-display 134, and/or the HMI 138. In this example a view 140 of a passenger is displayed on the HMI 138. The controller 118 may choose to display the image on the HMI 138 or the heads-up-display 134 when display 116 is occupied with critical objects.

In some instances, the controller 118 can be configured to train the driver or other user of the moved position of a display component. As noted above, movement of a display element that was once in a first position on the display to a second location may result in confusion. While the element may have been moved based on observation of driver behaviors, the display element is no longer in a familiar spot. The controller 118 can optionally show this element in both the first and second locations for a series of drive cycles for a given driver. For example, the controller 118 can perform this function for a set number of ignition cycles or for a number of days. Over that time, the driver is being trained by the controller 118 to look for the object in either spot. Once the display object is no longer present in the first location, the driver may automatically look to the second location.

In some instances, the controller 118 can determine when the driver is accessing certain functions or display buttons that require gestures or manipulations. For example, the controller 118 can determine that the driver uses a function that requires swipe or tap gestures and/or menu navigation. The controller 118 can prominently display these features on a display for easy driver access. In some instances, the controller 118 can learn driver preferences over time and adjust locations of chosen soft buttons (e.g., UI display buttons) on display or related HMI.

The controller 118 can also be configured to alter a size or positioning of icons, fonts, or other user interface layout parameters based on driver distance from various displays or screens. In use cases where the automatic vehicle component adjustment made by the controller 118 involves changing the distance between the driver and the display/HMI, corresponding changes to the user interface can take place in response.

Figure 3:
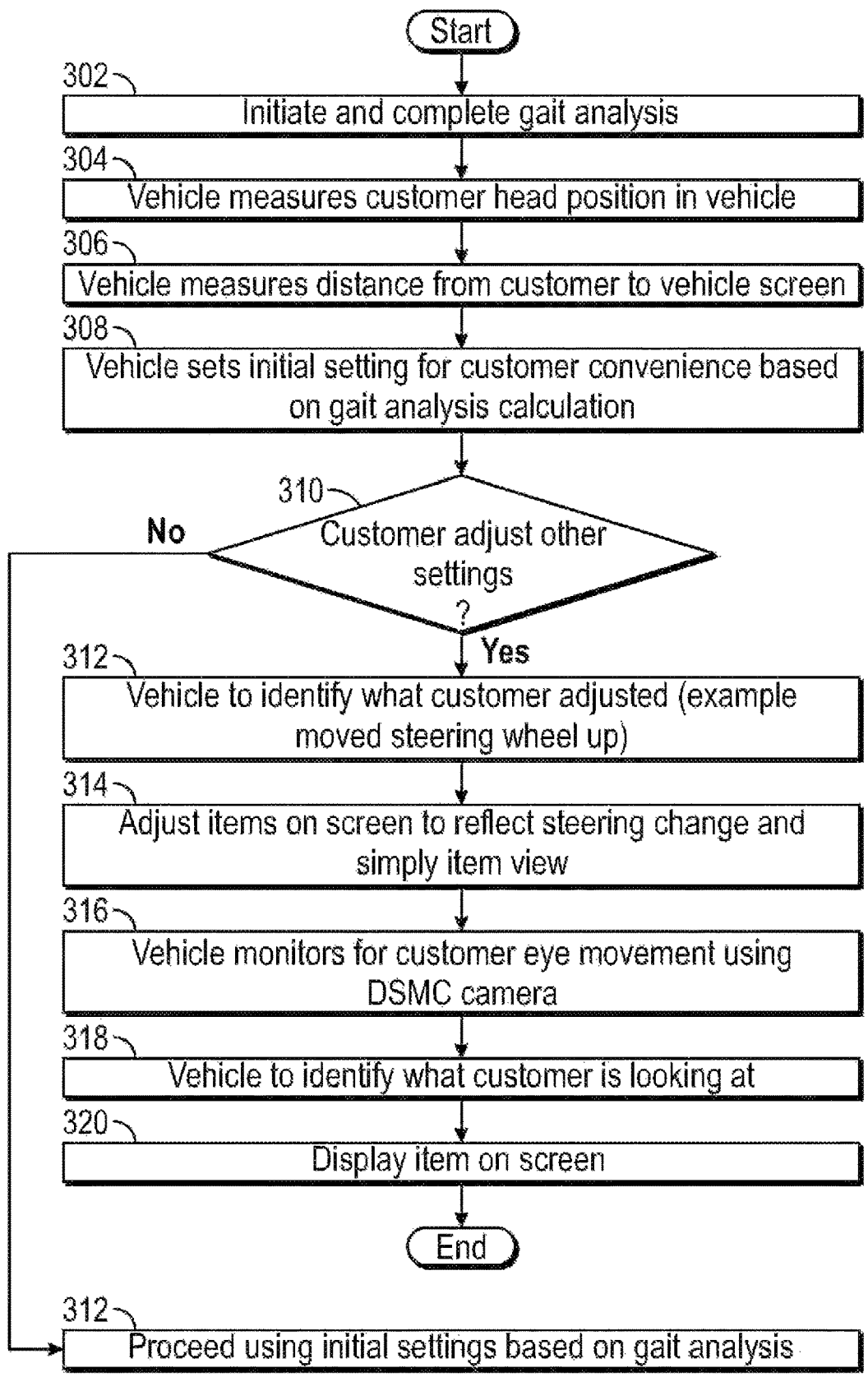
FIG. 3 is a flowchart of an example method in accordance with one or more embodiments of the disclosure.

FIG. 3 is a flowchart of an example method of the present disclosure. The method begins with a step 302 of initiating and completing a gait analysis. As noted above, this can include using camera images to determine biometric or physical dimensions of a user, as well as posture. Next, the method can include a step 304 of determining where a user's head is positioned when the user is seated in the vehicle. The gait and/or head position can be tracked in real-time or near-real-time.

In some instances, the initial settings are established for convenience and/or comfort based on the gait and/or head position in step 306. These initial settings pertain to adjustment(s) of vehicle components. For example, adjustments can be made to the user's seat position based on the gait analysis. Other adjustments can be made to, for example, mirror angle(s), steering wheel tilt, steering column length/angle, display position, and so forth—just to name a few.

In step 308, after automatic adjustments have been made, a determination can be made as to whether the user has made additional setting adjustments to vehicle components. For example, the user may fine tune any of the above settings of vehicle components. Step 310 involves using the automatic adjustments when no additional setting adjustments have been executed. In step 312 a determination is made as to what user adjustments were made.

In step 314 the method involves adjusting items such as buttons, icons, widgets, and so forth on one or more displays based on the changes to the vehicle component settings. In one example, this can include moving an object upwardly on the display to allow the user to view the object so that the eye gaze of the user is above a steering wheel. This is advantageous in instances where a display may be partially obscured by a portion of the steering wheel.

In step 316 the method includes monitoring changes in eye gaze of the user. This can also include detecting changes in head position, such as when a user repeatedly turns their head to view something in the back seat of the vehicle. In some instances, this can be accomplished using a digital still and motion camera (DSMC) in the vehicle. In step 318, a determination is made as to what item/object the user is looking at, and in step 320 the item/object can be displayed. For example, if the user is looking at a passenger in the back seat, a video or image of the passenger can be displayed on a display, such as an instrument cluster or HMI/infotainment system. In some instances, the method can include automatic adjustments to a vehicle component based on the changes in the head position and eye gaze of the user. For example, if it is determined that the user is frequently leaning to the side to view a portion of the instrument cluster, an adjustment can be made to the steering wheel or the item that the user is looking at on the instrument cluster can be moved to a position that is in the line of sight of the user and not obscured by the steering wheel.

Figure 4:
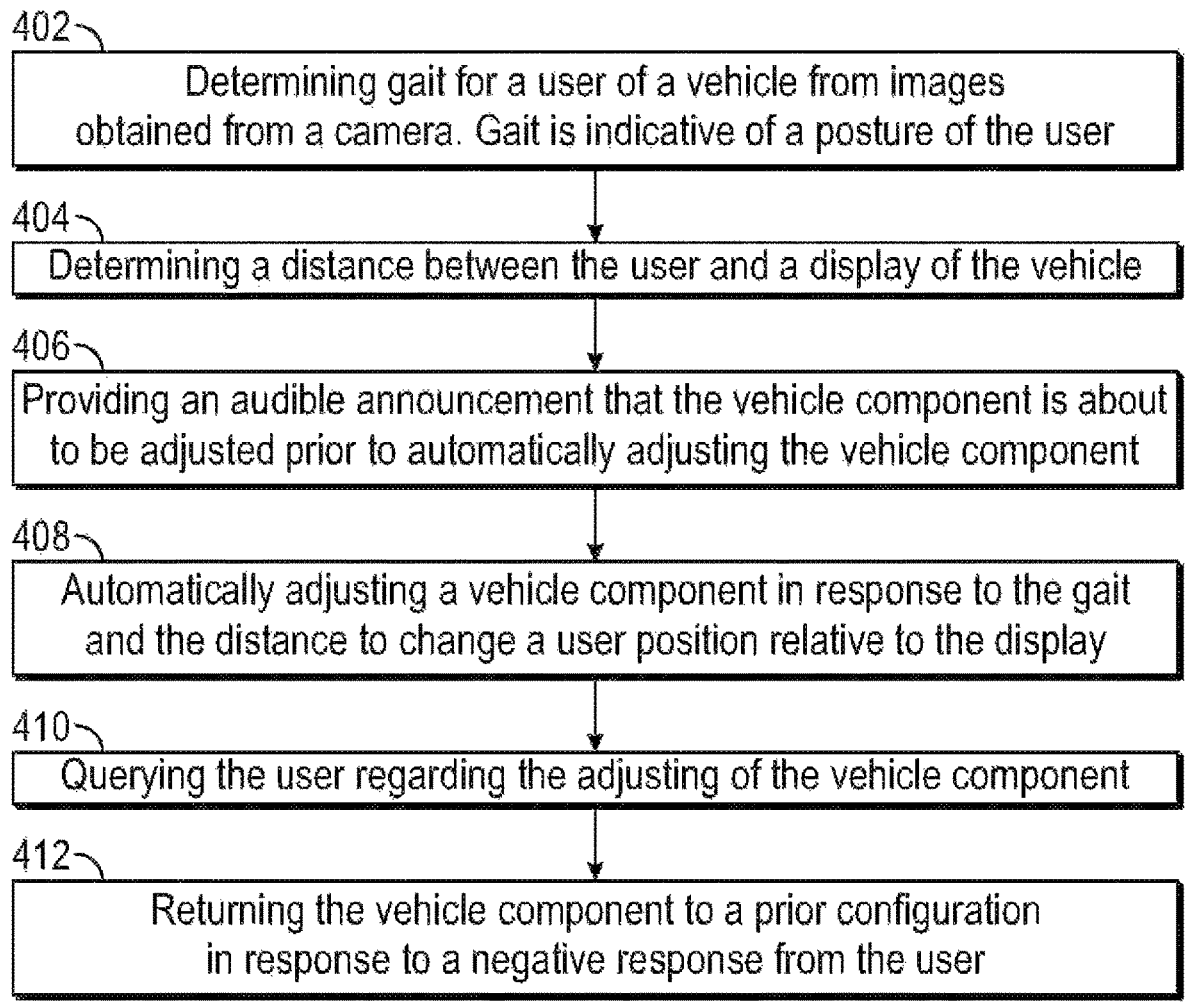
FIG. 4 is a flowchart of an example method in accordance with one or more embodiments of the disclosure.

FIG. 4 is a flowchart of another example method of the present disclosure. The method can include a step 402 of determining gait for a user of a vehicle from images obtained from a camera. As noted, the gait is indicative of a posture of the user. In some instances, determining the gait for the user comprises determining measurements of a body of the user.

The method can also include a step 404 of determining a distance between the user and a display of the vehicle. As noted above, this can be accomplished using a radar sensor positioned in the vehicle or other similar distance measuring sensor.

The method can include a step 406 of providing an audible announcement that the vehicle component is about to be adjusted prior to automatically adjusting the vehicle component. In some instances, the user can verbally approve or deny the automatic adjustment.

The method can include a step 408 of automatically adjusting a vehicle component in response to the gait and the distance to change a user position relative to the display. In some instances, the adjustment to the vehicle component is done to ensure that the user has an optimal viewing angle to the display. As noted above, in instances where this cannot be achieved, adjustments can be made to the configuration of the user interface on the display to move critical items into view.

Once adjustments have been made, the method can include a step 410 of querying the user regarding the adjusting of the vehicle component. This querying could be audible using natural language procession or through a user interface presented on a display. The method can include a step 412 of returning the vehicle component to a prior configuration in response to a negative response from the user. If the user affirms the settings, they can be stored in vehicle memory 128 or cloud memory and associated with the biometric traits of the user for later recall and use.

Implementations of the systems, apparatuses, devices and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

The foregoing detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The detailed description is, therefore, not to be taken in a limiting sense, and the scope is defined by the appended claims and their equivalents.

Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching.

What is claimed is:

1. A method comprising:
   determining gait for a user of a vehicle from images obtained from a camera, the gait being indicative of a posture of the user;
   determining, based on the posture of the user, a distance between the user and a display of the vehicle;
   automatically adjusting a vehicle component in response to the gait and the distance to change a user position relative to the display;
   identifying an object on a first display that the user has repeatedly viewed using an eye gaze of the user; and
   moving, based on identifying that the user has repeatedly viewed the object on the first display, the object to a line of sight of the user on a second display.

2. The method according to claim 1, wherein automatically adjusting the vehicle component comprises adjusting a position of a head of the user relative to the display of the vehicle by adjusting a seat of the vehicle occupied by the user.

3. The method according to claim 1, wherein automatically adjusting the vehicle component comprises adjusting a location of an object on the display based on a position of a head of the user relative to the display.

4. The method according to claim 1, wherein determining the gait for the user comprises determining measurements of a body of the user.

5. The method according to claim 1, further comprising providing an audible announcement that the vehicle component is about to be adjusted prior to automatically adjusting the vehicle component.

6. The method according to claim 1, further comprising determining changes in head position and eye gaze of the user, wherein automatically adjusting of the vehicle component is based on the changes in the head position and the eye gaze of the user.

7. The method according to claim 6, further comprising moving an object upwardly on the display to allow the user to view the object so that the eye gaze of the user is above a steering wheel.

8. The method according to claim 1, further comprising displaying the object on the display based on images captured by the camera.

9. The method according to claim 1, further comprising:
querying the user regarding the adjusting of the vehicle component; and
returning the vehicle component to a prior configuration based on a negative response from the user.

10. The method according to claim 1, wherein automatically adjusting the vehicle component includes adjusting a tilt of the display or a position of a steering wheel.

11. The method according to claim 1, further comprising:
obtaining an image of an occupant within the vehicle; and
displaying the image of the occupant on the second display.

12. A system comprising:
a camera positioned within a vehicle;
a seat having an adjustable component that is controllable to change a seated position of a user;
a distance measurement device positioned in front of the seat of the vehicle;
a controller comprising a memory for storing instructions, and a processor that executes the instructions to:
determine a gait of the user of the vehicle from images obtained from the camera, the gait being indicative of a posture of the user;
determine a distance between the user and a display of the vehicle using the distance measurement device;
automatically control the adjustable component in response to the gait and the distance to change the seated position of the user relative to the display or a steering wheel of the vehicle;
identify an object on a first display that the user has repeatedly viewed using an eye gaze of the user; and
move, based on identifying that the user has repeatedly viewed the object on the first display, the object to a line of sight of the user on a second display.

13. The system according to claim 12, wherein the controller is configured to adjust a location of an object on the display based on a position of a head of the user relative to the display.

14. The system according to claim 12, wherein the controller is configured to determine the gait for the user comprises determining measurements of a body of the user.

15. The system according to claim 12, wherein the controller is configured to provide an audible announcement that the adjustable component is about to be adjusted prior to automatically adjusting the adjustable component.

16. A method comprising:
performing a gait analysis for a user positioned in a seat of a vehicle;
determining a position of a head of the user;
determining a distance between the user and a display of the vehicle;
automatically adjusting a vehicle component in response to the gait analysis and the distance in order to change a position of the user;
determining when the user has made an additional adjustment to the vehicle component;
adjusting an object on the display based on a current seated position of the user;
identifying an object on a first display that the user has repeatedly viewed using an eye gaze of the user; and
moving, based on identifying that the user has repeatedly viewed the object on the first display, the object to a line of sight of the user on a second display.

17. The method according to claim 16, further comprising determining changes in head position and eye gaze of the user, wherein automatically adjusting of the vehicle component is based on the changes in the head position and the eye gaze of the user.

18. The method according to claim 17, further comprising:
moving the object upwardly on the display to allow the user to view the object so that the eye gaze of the user is above a steering wheel.

\* \* \* \* \*